United States Patent
Chen et al.

(10) Patent No.: US 7,587,541 B2
(45) Date of Patent: Sep. 8, 2009

(54) MASTER-SLAVE DEVICE COMMUNICATION CIRCUIT

(75) Inventors: Yang-Yuan Chen, Taipei Hsien (TW); Ming-Chih Hsieh, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 72 days.

(21) Appl. No.: 11/965,746

(22) Filed: Dec. 28, 2007

(65) Prior Publication Data

US 2009/0150587 A1   Jun. 11, 2009

(30) Foreign Application Priority Data

Dec. 6, 2007   (CN) .................. 2007 1 0202883

(51) Int. Cl.
*G06F 13/00* (2006.01)
(52) U.S. Cl. .............. 710/110; 327/264; 327/265; 327/276; 327/278; 327/279; 710/106
(58) Field of Classification Search ............ 710/106, 710/110; 326/28, 31, 86, 93; 327/261, 264, 327/265, 276–279, 281, 283
See application file for complete search history.

(56) References Cited

U.S. PATENT DOCUMENTS

| | | | |
|---|---|---|---|
| 6,208,548 B1* | 3/2001 | Kawagoe | 365/63 |
| 6,918,048 B2* | 7/2005 | Zumkehr | 713/401 |
| 7,206,882 B2* | 4/2007 | White et al. | 710/110 |
| 2005/0001668 A1* | 1/2005 | Kuppuswamy et al. | 327/276 |
| 2006/0242348 A1* | 10/2006 | Humphrey et al. | 710/305 |
| 2007/0018708 A1* | 1/2007 | Yoo | 327/261 |

* cited by examiner

*Primary Examiner*—Glenn A Auve
(74) *Attorney, Agent, or Firm*—Frank R. Niranjan

(57) ABSTRACT

A master-slave device communication circuit includes a master device, a bus, and a slave device having a bus switch connected to the master device via the bus, and a status detecting circuit. The status detecting circuit includes a power input terminal and a detecting signal output terminal. A power terminal of the master device is connected to the power input terminal of the status detecting circuit. The detecting signal output terminal is connected to the bus switch and a trigger pin of the master device. When the master device supplies power to the slave device via the power terminal thereof, the detecting signal output terminal transmits a control signal to control the bus switch to turn on the bus and trigger the master device to communicate with the slave device after a delay time.

8 Claims, 2 Drawing Sheets

MASTER-SLAVE DEVICE COMMUNICATION CIRCUIT

BACKGROUND

1. Field of the Invention

The present invention relates to communication circuits, and particularly to a communication which communicates between a master device and a slave device thereof.

2. Description of Related Art

In some communication systems, a master device such as a central processing unit (CPU) communicates with some slave devices such as DRAMs via buses. Generally, when the master device needs to access a slave device, the master device will transmit a corresponding selecting signal such as a power signal to the slave device. When the slave device receives the selecting signal, the master device will communicate with the slave device immediately. However, sometimes when the master device transmits the selecting signal to the slave device, the slave device is not at a ready status, which may cause data transmitting errors between the master device and the slave device.

What is desired, therefore, is to provide a master-slave device communication circuit that overcomes the above problem.

SUMMARY

An embodiment of a master-slave device communication circuit includes a master device, a bus, and a slave device having a bus switch connected to the master device via the bus, and a status detecting circuit. The status detecting circuit includes a power input terminal and a detecting signal output terminal. A power terminal of the master device is connected to the power input terminal of the status detecting circuit. The detecting signal output terminal is connected to the bus switch and a trigger pin of the master device. When the master device supplies power to the slave device via the power terminal thereof, the detecting signal output terminal transmits a control signal to control the bus switch to turn on the bus and trigger the master device to communicate with the slave device after a delay time.

Other advantages and novel features of the present invention will become more apparent from the following detailed description of an embodiment when taken in conjunction with the accompanying drawings, in which:

DETAILED DESCRIPTION

Figure 1:
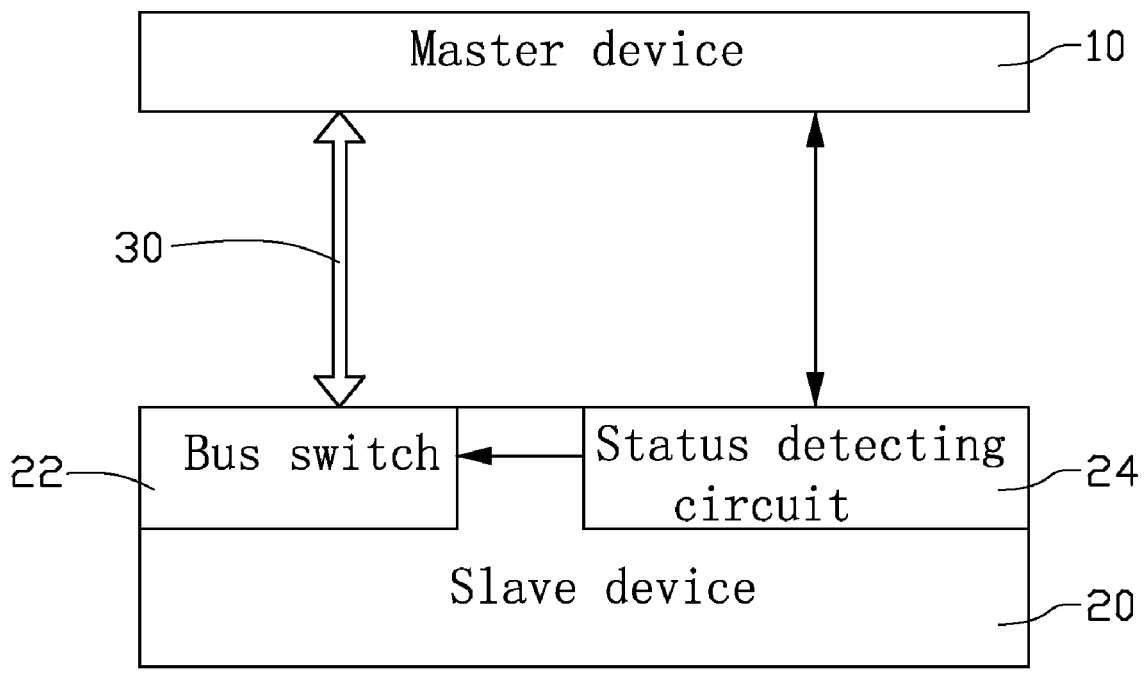
FIG. 1 is a block diagram of a master-slave device communication circuit in accordance with an embodiment of the present invention.
Figure 2:
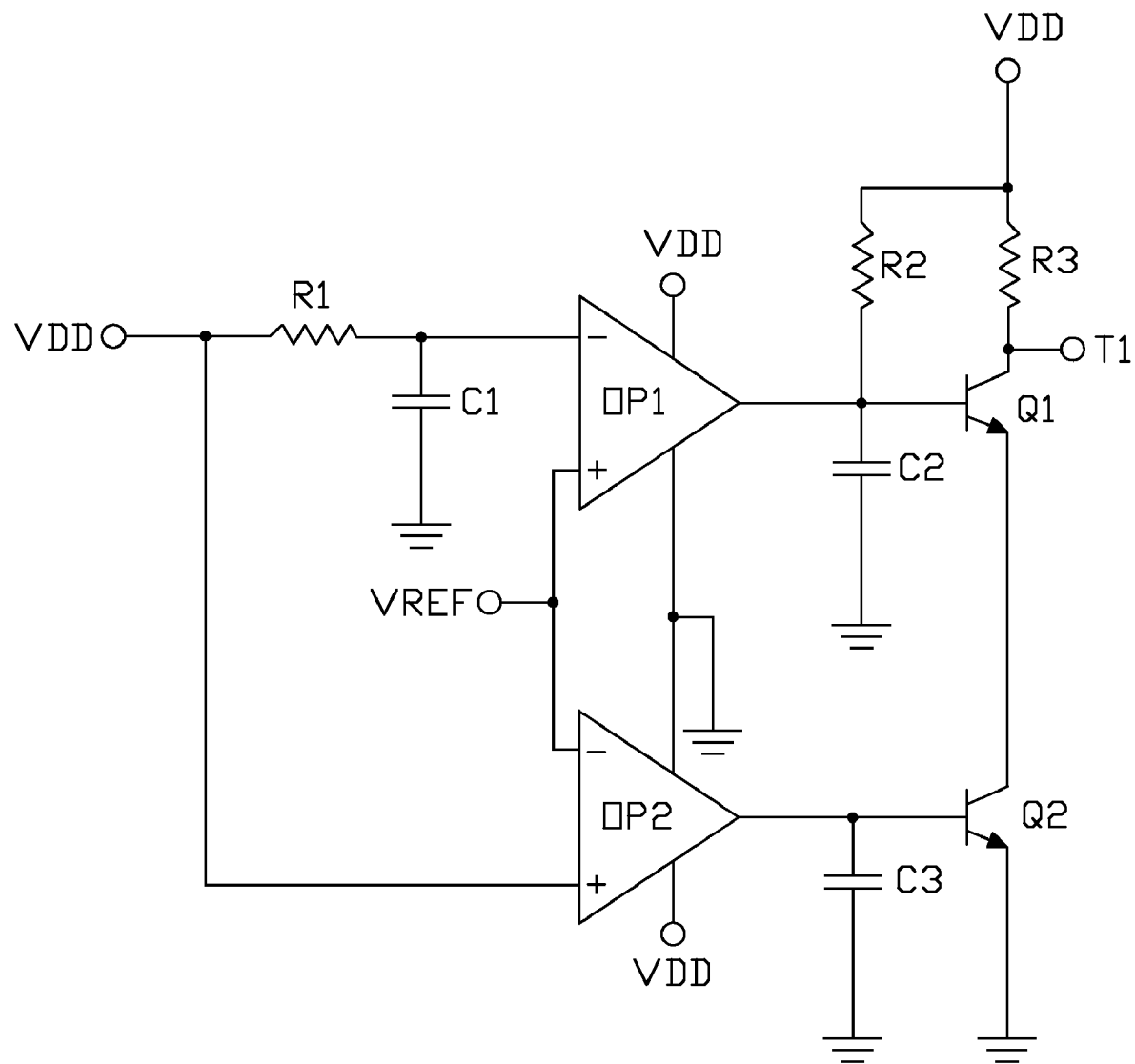
FIG. 2 is a circuit diagram of a status detecting circuit of the master-slave device communication circuit of FIG. 1.

Referring to FIGS. 1 and 2, a master-slave device communication circuit in accordance with an embodiment of the present invention includes a master device 10, a slave device 20, a bus 30 connecting the master device 10 to the slave device 20. The slave device includes a bus switch 22 connected to the bus 30 and a status detecting circuit 24.

The status detecting circuit 24 includes a first voltage comparator OP1, a second voltage comparator OP2, a first electrical switch such as an NPN transistor Q1, a second electrical switch such as an NPN transistor Q2, a first resistor R1, a second resistor R2, a third resistor R3, a first capacitor C1, a second capacitor C2, and a third capacitor C3.

A power terminal VDD of the master device 10 is connected to the inverting input terminal of the first voltage comparator OP1 via the first resistor R1 and connected to the non-inverting input terminal of the second voltage comparator OP2. The first capacitor C1 is connected between the inverting input terminal of the first voltage comparator OP1 and ground. The non-inverting input terminal of the first voltage comparator OP1 and the inverting input terminal of the second voltage comparator OP2 are connected to a reference voltage source VREF. The power terminals of the two voltage comparators OP1 and OP2 are connected to the power terminal VDD of the master device 10. The ground terminals of the two voltage comparators OP1 and OP2 are grounded.

The output terminal of the first voltage comparator OP1 is connected to the base of the transistor Q1 and connected to ground via the second capacitor C2. The power terminal VDD of the master device 10 is connected to the base of the transistor Q1 via the second resistor R2. The collector of the transistor Q1 is connected to the power terminal VDD via the third resistor R3 and as a detecting signal output terminal T1 connected to the bus switch 22 and a trigger pin, such as a general purpose I/O (GPIO) pin, of the master device 10. The emitter of the transistor Q1 is connected to the collector of the transistor Q2. The output terminal of the second voltage comparator OP2 is connected to the base of the transistor Q2 and ground via the third capacitor C3. The emitter of the transistor Q2 is grounded.

When the master device 10 needs to access the slave device 20, the master device 10 supplies power to the slave device 20 via the power terminal VDD of the master device 10. Initially, because the RC circuit of the first resistor R1 and the first capacitor C1 has delay function, the voltage of the inverting input terminal is less than the voltage of the non-inverting input terminal of the first voltage comparator OP1. Thereby, the voltage of the output terminal of the first voltage comparator OP1 is at a high voltage level, and the transistor Q1 is turned on. At this initial state, the voltage of the inverting input terminal is less than the voltage of the non-inverting input terminal of the second voltage comparator OP2. Thereby, the voltage of the output terminal of the second voltage comparator OP2 is at a high voltage level, and the transistor Q2 is turned on. The detecting signal output terminal T1 transmits a low voltage signal to the bus switch 22 and the trigger pin of the master device 10.

After a delay time, the voltage of the inverting input terminal becomes greater than the voltage of the non-inverting input terminal of the first voltage comparator OP1. Thereby, the voltage of the output terminal of the first voltage comparator OP1 is at a low voltage level, and the transistor Q1 is turned off. The delay time allows the slave device 20 to enter a ready state. Then, the detecting signal output terminal T1 transmits a control signal that goes from low to high to the bus switch 22 to control the bus switch 22 to turn on the bus 30, and the control signal is also transmitted to the trigger pin of the master device 10, and then the master device 10 is triggered to communicate with the slave device 20.

The delay time can be selected by selecting the resistance of the first resistor R1 and the capacitance of the first capacitor C1 according to need. After the delay time, the slave device 20 is to communicate with the master device 10, which prevents data transmitting errors between the master device 10 and the slave device 20.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A master-slave device communication circuit, comprising:
   a master device;
   a bus; and
   a slave device having a bus switch connected to the master device via the bus, and a status detecting circuit having a power input terminal and a detecting signal output terminal, a power terminal of the master device connected to the power input terminal of the status detecting circuit, the detecting signal output terminal connected to the bus switch and a trigger pin of the master device, when the master device supplies power to the slave device via the power terminal thereof, the detecting signal output terminal transmits a control signal to control the bus switch to turn on the bus and trigger the master device to communicate with the slave device after a delay time.

2. The master-slave device communication circuit as claimed in claim 1, wherein the status detecting circuit comprises a first voltage comparator, a first electrical switch, a first resistor, and a first capacitor, the power terminal of the master device is connected to the inverting input terminal of the first voltage comparator via the first resistor, the first capacitor is connected between the inverting input terminal of the first voltage comparator and ground, the non-inverting input terminal of the first voltage comparator is connected to a reference voltage source, the output terminal of the first voltage comparator is connected to the first terminal of the first electrical switch, the second terminal of the first electrical switch is connected to the power terminal of the master device and as the detecting signal output terminal, the third terminal of the first electrical switch is grounded, if the voltage of the output terminal of the first voltage comparator is at a high voltage, the first electrical switch is turned on, if the voltage of the output terminal of the first voltage comparator is at a low voltage, the first electrical switch is turned off.

3. The master-slave device communication circuit as claimed in claim 2, wherein the first electrical switch is an NPN transistor, the first, second, and third terminals of the first electrical switch are respectively the base, collector, and emitter of the NPN transistor.

4. The master-slave device communication circuit as claimed in claim 2, wherein a second capacitor is connected between the first terminal of the first electrical switch and ground, a second resistor is connected between the first terminal of the first electrical switch and the power terminal of the master device, a third resistor is connected between the second terminal of the first electrical switch and the power terminal of the master device.

5. The master-slave device communication circuit as claimed in claim 1, wherein the status detecting circuit comprises a first voltage comparator, a second voltage comparator, a first electrical switch, a second electrical switch, a first resistor, and a first capacitor, the power terminal of the master device is connected to the inverting input terminal of the first voltage comparator via the first resistor and connected to the non-inverting input terminal of the second voltage comparator, the first capacitor is connected between the inverting input terminal of the first voltage comparator and ground, the non-inverting input terminal of the first voltage comparator and the inverting input terminal of the second voltage comparator are connected to a reference voltage source, the output terminal of the first voltage comparator is connected to the first terminal of the first electrical switch, the second terminal of the first electrical switch is connected to the power terminal of the master device and as the detecting signal output terminal, the third terminal of the first electrical switch is connected to the second terminal of the second electrical switch, the output terminal of the second voltage comparator is connected to the first terminal of the second electrical switch, the third terminal of the second electrical switch is grounded.

6. The master-slave device communication circuit as claimed in claim 5, wherein the first and second electrical switches are NPN transistors, the first, second, and third terminals of the first and second electrical switches are respectively the base, collector, and emitter of the NPN transistors.

7. The master-slave device communication circuit as claimed in claim 5, wherein a second capacitor is connected between the first terminal of the first electrical switch and ground, a second resistor is connected between the first terminal of the first electrical switch and the power terminal of the master device, a third resistor is connected between the second terminal of the first electrical switch and the power terminal of the master device, a third capacitor is connected between the first terminal of the first electrical switch and ground.

8. The master-slave device communication circuit as claimed in claim 1, wherein the trigger pin of the master device is a general purpose I/O (GPIO) pin thereof.

* * * * *